(12) United States Patent
Chung

(10) Patent No.: US 11,300,244 B2
(45) Date of Patent: Apr. 12, 2022

(54) DISPLAY DEVICES

(71) Applicant: Hewlett-Packard Development Company, L.P., Spring, TX (US)

(72) Inventor: Tien Liang Chung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,930

(22) PCT Filed: Jan. 30, 2018

(86) PCT No.: PCT/US2018/015964
§ 371 (c)(1),
(2) Date: Jul. 30, 2019

(87) PCT Pub. No.: WO2019/151989
PCT Pub. Date: Aug. 8, 2019

(65) Prior Publication Data
US 2021/0332942 A1    Oct. 28, 2021

(51) Int. Cl.
*F16M 13/02*    (2006.01)
*F16M 11/22*    (2006.01)
*F16M 13/00*    (2006.01)
*G06F 1/18*    (2006.01)

(52) U.S. Cl.
CPC ............ *F16M 13/02* (2013.01); *F16M 11/22* (2013.01); *F16M 13/005* (2013.01); *G06F 1/181* (2013.01)

(58) Field of Classification Search
CPC combination set(s) only.
See application file for complete search history.

(56) References Cited

U.S. PATENT DOCUMENTS

| 5,765,794 | A | * | 6/1998 | Chen | ................ | F16M 11/10 |
| | | | | | | 248/292.12 |
| 5,812,368 | A | * | 9/1998 | Chen | ................ | F16M 11/10 |
| | | | | | | 16/376 |
| 6,229,584 | B1 | * | 5/2001 | Chuo | ................ | G06F 1/1601 |
| | | | | | | 248/917 |

(Continued)

FOREIGN PATENT DOCUMENTS

| CN | 101132670 A | 2/2008 | |
| GB | 2503505 A * | 1/2014 | ........ G07C 5/0866 |

(Continued)

*Primary Examiner* — Monica E Millner
(74) *Attorney, Agent, or Firm* — Lakshmi Kumaran & Sridharan

(57) ABSTRACT

The present subject matter discloses a display device having a stand mounting wall in an outer covering of the display device. The display device may further include a stand receptacle within the stand mounting wall. The stand receptacle having receptacle walls partially protruding from the stand mounting wall of the outer covering. Each of the receptacle walls may include a first end along an outer surface of the stand mounting wall. The first ends of the receptacle walls forming a first opening of the stand receptacle. Each of the receptacle walls may further include a second end forming a second opening of the stand receptacle. The display device may further include a receptacle covering movably disposed within the stand receptacle to conceal the first opening of stand receptacle.

14 Claims, 8 Drawing Sheets

(56) References Cited

U.S. PATENT DOCUMENTS

| | | | |
|---|---|---|---|
| 6,816,364 B2 * | 11/2004 | Helot | F16M 11/105 |
| | | | 248/919 |
| 6,822,857 B2 * | 11/2004 | Jung | F16M 11/24 |
| | | | 361/679.02 |
| 7,267,312 B2 | 9/2007 | Kang et al. | |
| 7,447,005 B2 | 11/2008 | Han | |
| 9,179,567 B2 | 11/2015 | Hung et al. | |
| 9,631,769 B2 | 4/2017 | McGowan et al. | |
| 9,665,125 B2 | 5/2017 | Browning et al. | |
| 9,689,527 B2 | 6/2017 | Franklin | |
| 9,690,332 B2 | 6/2017 | Liu et al. | |
| 10,114,408 B2 * | 10/2018 | Ent | G06F 1/1601 |
| 10,340,673 B2 * | 7/2019 | Li | H02G 3/0418 |
| 2005/0201046 A1 * | 9/2005 | Hwang | G06F 1/1601 |
| | | | 361/679.06 |
| 2006/0240704 A1 * | 10/2006 | Corbett | H04N 5/64 |
| | | | 439/502 |
| 2012/0325985 A1 * | 12/2012 | Slowinski | F16M 13/02 |
| | | | 248/121 |
| 2016/0041348 A1 | 2/2016 | Isenhour et al. | |

FOREIGN PATENT DOCUMENTS

| | | |
|---|---|---|
| JP | H04313298 | 11/1992 |
| KR | 1020090046230 A | 5/2009 |

\* cited by examiner

DISPLAY DEVICES

BACKGROUND

Display devices, such as a television (TV) and a desktop screen are used in various locations, such as homes, offices, and other commercial complexes to display information from a computer or other source of visual information. The display devices maybe placed over a table or a flat surface using a display stand attached to a base of the display device. The display stands in such display devices may be factory fitted or integrated with a frame of the display device. The display devices may alternately be provided with detachable stands that may be attached, in one example, to the base of the display device, for being placed over a table. In another example, the detachable stands may be attached to a back of the display device for being attached to a wall.

BRIEF DESCRIPTION OF DRAWINGS

The detailed description is described with reference to the accompanying figures. It should be noted that the description and figures are merely examples of the present subject matter and are not meant to represent the subject matter itself.

DETAILED DESCRIPTION

Figure 1:
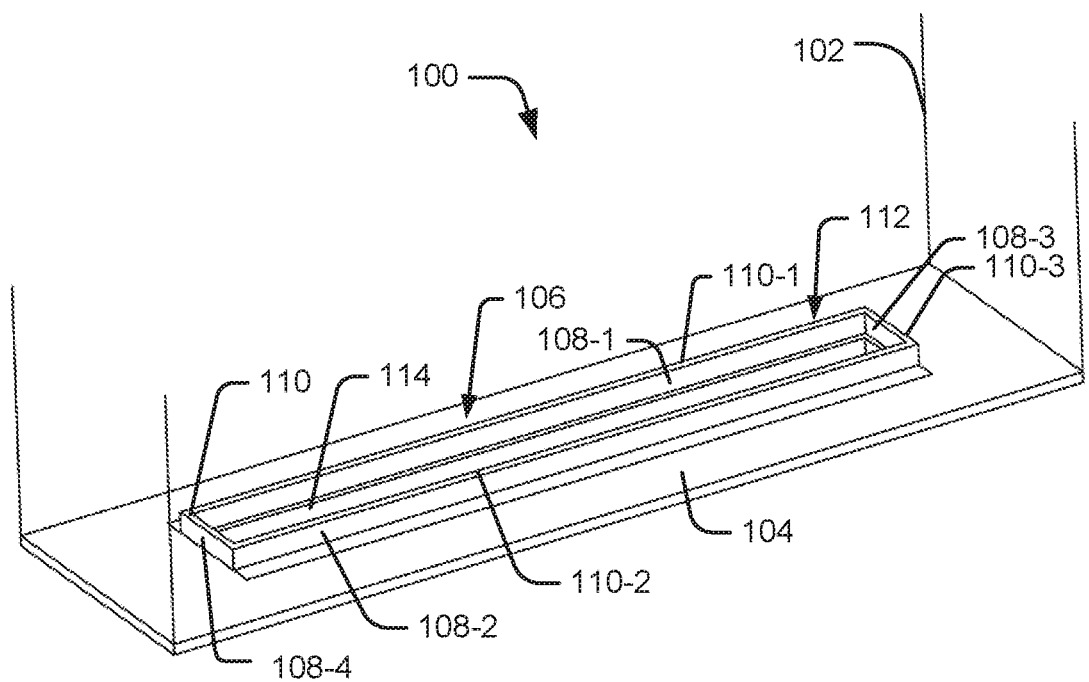
FIG. 1 illustrates a display device, according to an example of the present subject matter.

The subject matter relates to a display device with a detachable stand. Display devices maybe provided with a pre-fixed display stand attached to a base of the display device to place the display device over a table or a flat surface. Alternately, the display devices may be provided with detachable stands that may be attached to either the base or the back of the display device for being attached to a wall. Such detachable stands, however, have to be manually fixed by screws or fasteners to the display device. The manual fixing and removal of the detachable stands involves a lot of effort from the user and the user may have to use the services of a professional to fix the stand and install the display device. Additionally, a user may have to arrange for specific tools to fix and remove the detachable stand from the display device.

Further, the display device may be provided with fasteners and a cavity in the base of an outer covering of the display device to allow the detachable stand to be attached to the display device. Thus, when the display device is attached to the wall and the detachable stand is not used, the fasteners and the cavity may be visible, thereby affecting the aesthetics of the display screen. Further, the display devices are usually placed in a horizontal orientation such that the width of the display device is perpendicular to the ground. At times, however, the user may wish to install the display device in a vertical orientation, with the width of the display device being parallel to the ground. For instance, owing to space constraints or when used as an information display screen in a commercial establishment, the display devices may be placed in a vertical orientation. In such an orientation, the fasteners and the cavity will be visible, thus affecting the aesthetics of the display screen. Further, an open cavity may get filled with dust and a regular clean up may have to be undertaken.

The subject matter relates to a display device with a detachable stand. In an example implementation, the display device includes a stand receptacle to receive the detachable stand and a receptacle covering to conceal a first opening of the stand receptacle when the detachable stand is not attached to the display device. In one example, the receptacle covering is movably disposed inside the stand receptacle such that the receptacle covering is to move to a second position when the detachable stand is mounted inside the stand receptacle. When the detachable stand is removed, the receptacle covering may move to a first position to conceal the stand receptacle. The present subject matter thus facilitates in providing an aesthetically appealing display device having provisions for concealing the stand receptacle when the detachable stand is not attached to the display device.

In one example implementation of the present subject matter, a display device assembly includes a display device and a detachable stand to be attached to the display device to provide a support to the display device. The display device includes a stand receptacle assembly having the stand receptacle within a stand mounting wall of an outer covering of the display device, to receive the detachable stand. In one example, the stand receptacle includes receptacle walls partially protruding from the stand mounting wall of the outer covering. Further, each of the receptacle walls includes a first end along an outer surface of the stand mounting wall such that the first ends of the receptacle walls form the first opening of the stand receptacle. Each of the receptacle walls further includes a second end such that the second ends of the receptacle walls form a second opening of the stand receptacle.

The display device further includes the receptacle covering movably disposed within the stand receptacle to conceal the first opening of stand receptacle in a default state. In one example, the receptacle covering may be at the first position in the default state. Further, the receptacle covering may be made of the same material as the outer covering so that the receptacle covering may seem to be a part of the outer covering in the default state.

The stand receptacle assembly may further include a first attachment assembly to detachably attach to the detachable stand in response to the detachable stand being mounted inside the stand receptacle. In one example, the first attachment assembly may attach to a second attachment assembly of the detachable stand to attach the display device and the detachable stand. In one example implementation, the attachment assemblies include magnets to provide the attachment between the detachable stand and the display device.

In operation, when the detachable stand is to be attached to the display device, the detachable stand may be pushed inside the stand receptacle, thereby moving the receptacle covering to the second position. In one example, the receptacle covering may move towards the second end of the receptacle walls in response to the attachment of the detachable stand. As the detachable stand is pushed inside the stand receptacle, the magnets of the first attachment assembly may exert a magnetic force on the magnets of the second attachment assembly, thereby pulling the stand receptacle further towards the second opening at the second end, to mount the detachable stand in the stand receptacle. Further, to detach the detachable stand from the display device, a user may pull the detachable stand using a force slightly greater than the magnetic force between the magnets of the attachment assemblies. The receptacle covering may thus move towards the first opening in response to the detachment of the detachable stand.

The present subject matter thus provides an easy to install display device assembly having a detachable stand and a display device. Having the receptacle covering to conceal the stand receptacle makes the appearance of the display device better when the display device is mounted in a vertical orientation or on a wall. Apart from enhancing the aesthetics of the display device, the receptacle covering further facilitates in keeping external matter, such as dust, away from entering the display device through the stand receptacle. Further, using the current attachment assemblies having the magnets facilitates in providing a detachable stand that may be effortlessly attached or detached from the display device with very little force. Further, having a magnet based assembly helps in making the installation of the display device less complicated and allows the detachable stand to be completely attached without the use of any additional tools.

The present subject matter is further described with reference to FIGS. 1 to 8. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a display device 100, according to an example implementation of the present subject matter. Examples of the display device 100 include, but are not limited to, a television (TV) and a desktop screen. In one example, the display device 100 includes an outer covering 102 having a stand mounting wall 104. The stand mounting wall 104, in one example, may be used for mounting a detachable stand (not shown in this figure) to the display device 100. The display device 100 further includes a stand receptacle 106 within the stand mounting wall 104 of the outer covering 102 of the display device 100.

In one example implementation of the present subject matter, the stand receptacle 106 includes receptacle walls 108-1, 108-2, 108-3, and 108-4. The receptacle walls 108-1, 108-2, 108-3, and 108-4 are, hereinafter, collectively referred to as receptacle walls 108 and individually as receptacle wall 108. As illustrated, the receptacle walls 108 may be partially protruding from the stand mounting wall 104 of the outer covering 102. Further, each of the receptacle walls 108 includes a first end (not shown in this figure) along an outer surface (not shown in this figure) of the stand mounting wall 108. In one example implementation, the first ends of the receptacle walls 108 may form a first opening (not shown in this figure) of the stand receptacle 106.

Each of the receptacle walls 108 may further include a second end. For instance, the receptacle walls 108-1, 108-2, 108-3, and 108-4 may include the second ends 110-1, 110-2, 110-3, and 110-4, hereinafter, collectively referred to as second ends 110 and individually as second end 110. In one example implementation, the second ends 110 of the receptacle walls 108 may form a second opening 112 of the stand receptacle 106. The display device 100 may further include a receptacle covering 114 movably disposed within the stand receptacle 106 to conceal the first opening of stand receptacle 106.

Figure 2:
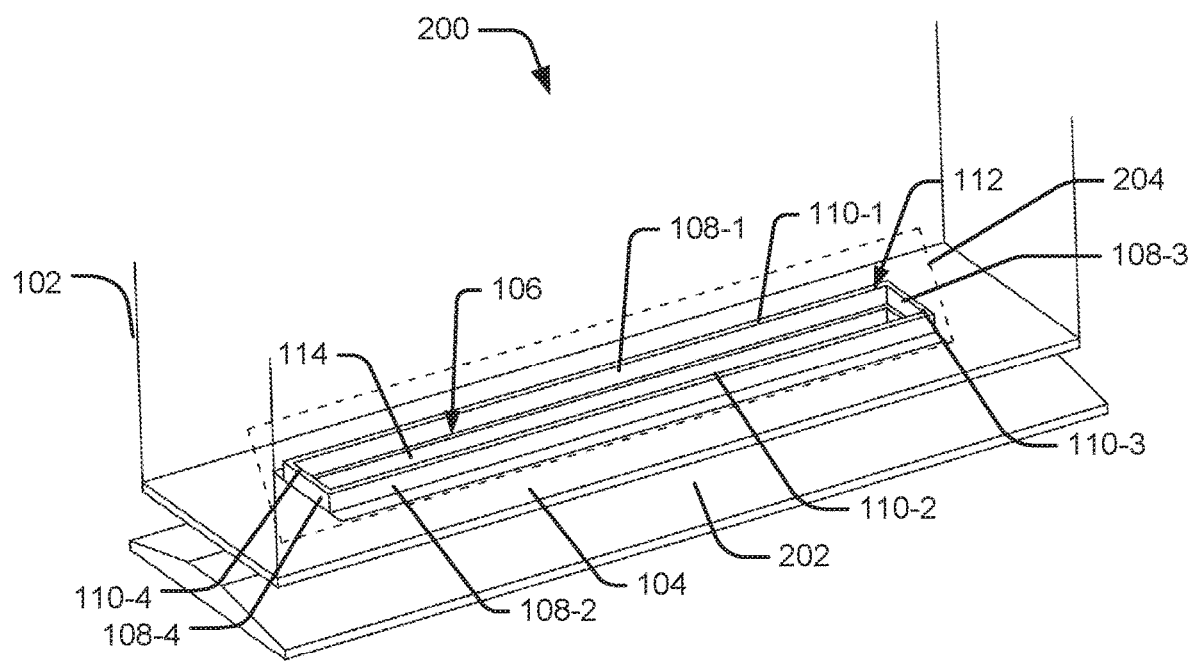
FIG. 2 illustrates a display device assembly, according to an example of the present subject matter.

FIG. 2 illustrates a display device assembly 200, according to an example implementation of the present subject matter. In one example, the display device assembly 200 includes the display device 100 and a detachable stand 202 to be attached to the display device 100 to provide a support to the display device 100. In one example, the display device 100 includes the outer covering 102 housing a stand receptacle assembly 204. Further, the detachable stand 202 may be provided along with the display device 100 in a detached state.

In one example implementation of the present subject matter, the stand receptacle assembly 204 may include the stand receptacle 106 within the stand mounting wall 104 of the outer covering 102 to receive the detachable stand 202. The stand receptacle 106 may include the receptacle walls 108 on the stand mounting wall 104. Further, each of the receptacle walls 108 may include a first end along an outer surface of the stand mounting wall 104 and the second end 110. In one example, the first ends of the receptacle walls 108 form a first opening of the stand receptacle 106 and the second ends 110 form the second opening 112 of the stand receptacle 106.

The stand receptacle assembly 204 may further include the receptacle covering 114 movably disposed within the stand receptacle 106 to conceal the first opening. In one example, the receptacle covering 114 is to move to the second opening 112 in response to attachment of the detachable stand 202 to the display device 100.

Figure 3:
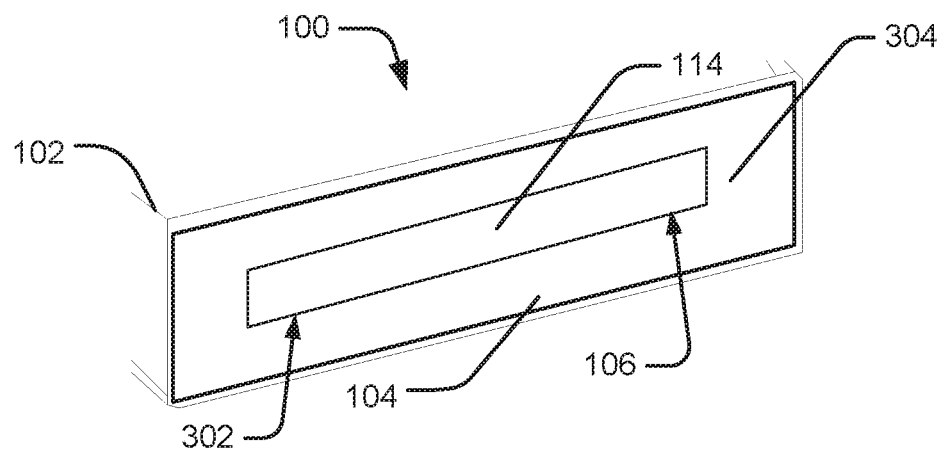
FIG. 3 illustrates a bottom view of a display device, according to another example of the present subject matter.

FIG. 3 illustrates a bottom view of the display device 100, according to another example implementation of the present subject matter. In one example, the display device 100 includes the outer covering 102 having the stand mounting wall 104 and the stand receptacle assembly 204 disposed within the stand mounting wall 104. Further, the stand receptacle assembly 204 may include the stand receptacle 106 within the stand mounting wall 104 to receive the detachable stand 202. In one example, the stand receptacle 106 includes a first opening 302 along an outer surface 304 of the stand mounting wall 104. The stand receptacle 106 may further include the second opening 112 along the second ends 110 of the receptacle walls 108 protruding from the stand mounting wall 104.

The stand receptacle assembly 204 may further include the receptacle covering 114 movably disposed within the stand receptacle 106 such that the receptacle covering 114 is to move to a first position, along the outer surface of the stand mounting wall 104, in response to detachment of the detachable stand 202 from the display device 100. In one example, the receptacle covering 114 may move to the first position to conceal the stand receptacle 106. The receptacle covering 114 may further move inside the stand receptacle 106 to a second position in response to attachment of the detachable stand 202 to the display device 100.

Further, the stand receptacle assembly 204 may include a first attachment assembly (not shown in this figure) to detachably attach to the detachable stand 202 in response to the detachable stand 202 being mounted inside the stand receptacle.

Figure 4:
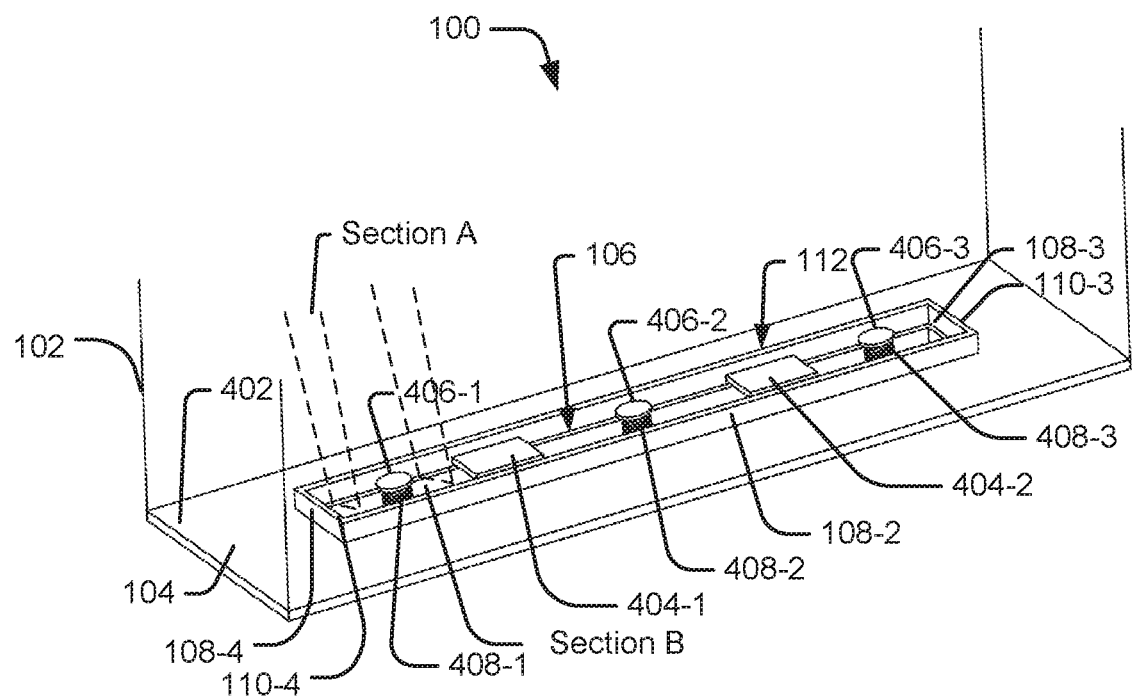
FIG. 4 illustrates a display device with a stand receptacle assembly in a detached state, according to an example of the present subject matter.
Figure 5:
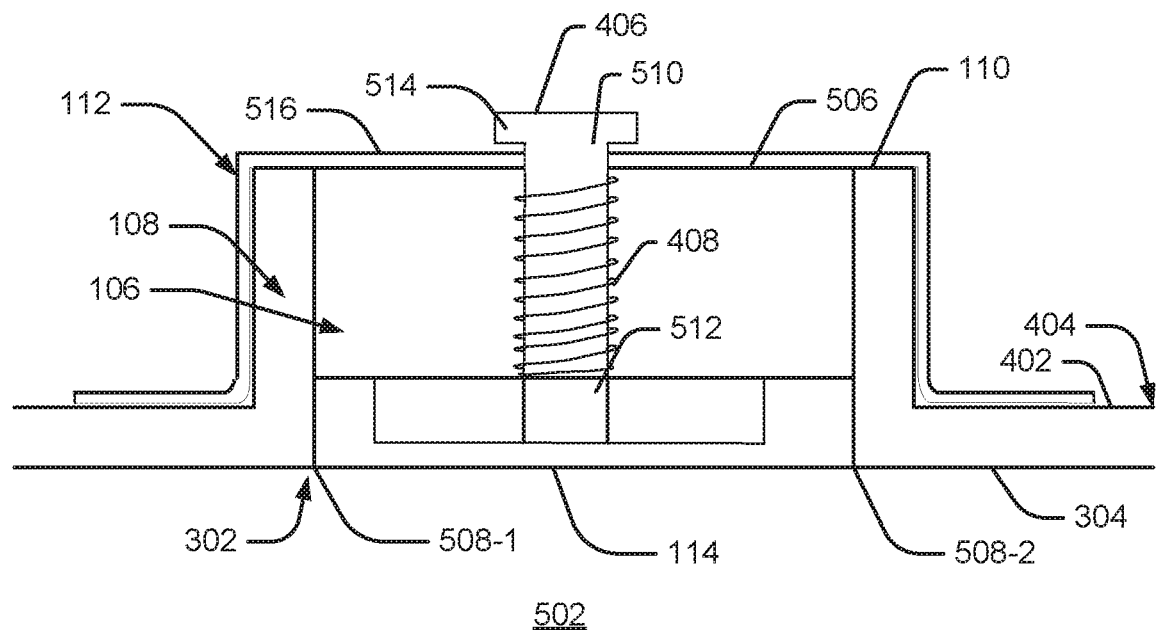
FIG. 5 illustrates sectional views of the display device with a stand receptacle assembly in a detached state, according to an example of the present subject matter.
Figure 5:
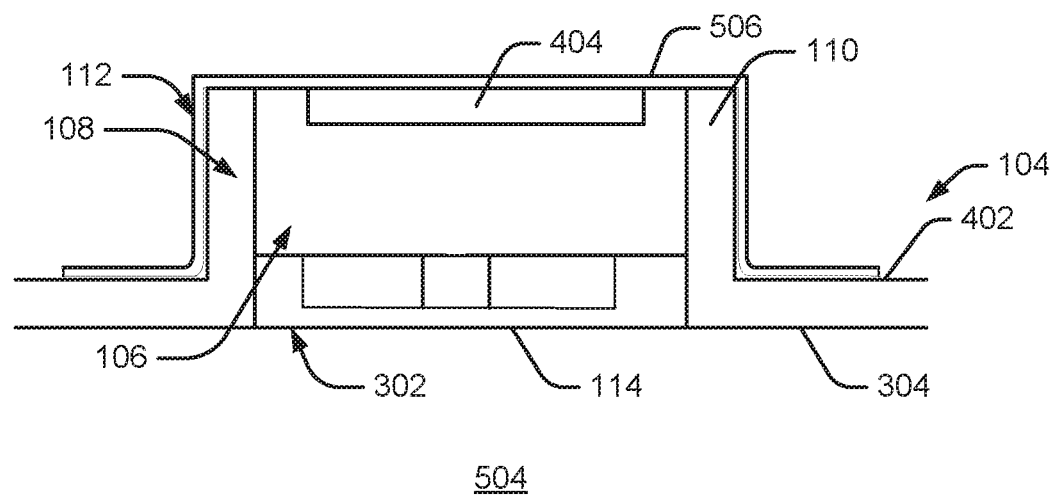

FIG. 4 illustrates the display device 100 with the stand receptacle assembly 204 in a detached state, according to an example of the present subject matter. In one example, the display device 100 may be a device for rendering visual content, such as text, images, video, and audio-video content in various locations, such as homes, offices, and other commercial complexes. Examples of the display device 100 include, but are not limited to, a television (TV) and a desktop screen. The FIG. 4 is further explained in conjunction with FIG. 5 for better clarity. FIG. 5 illustrates sectional views of the display device 100 with the stand receptacle assembly 204 in a detached state, according to an example of the present subject matter. 502 illustrates a cross sectional view of the display device 100 along the section A as indicated in FIG. 4. 504 illustrates a cross sectional view of the display device 100 along the section B as indicated in FIG. 4.

In one example, the display device 100 includes the outer covering 102 having the stand mounting wall 104, the stand receptacle assembly 204 having the stand receptacle 106 and the receptacle covering 114, a mounting bracket 506, and a first attachment assembly.

The stand mounting wall 104 may be a wall of the outer covering 102 that may be used for mounting the detachable stand 202 to the display device 100. In one example, stand mounting wall 104 may be a base of the outer covering 102 for mounting the detachable stand 202 to allow the display device 100 to be placed over a flat surface, such as a table. In another example, the stand mounting wall 104 may be a back of the outer covering 102 for mounting the detachable stand 202 to allow the display device 100 to be mounted on a wall of a room. In yet another example, the outer covering 102 may have two stand mounting walls such that a first stand mounting wall may be the base of the outer covering 102 and a second stand mounting wall may be a back of the outer covering 102.

Further, in one example, the display device 100 may be placed on the table or attached to the wall such that the stand mounting wall 104 is in a direction parallel to the ground. In another example, the display device 100 may be placed on the table or attached to the wall such that the stand mounting wall 104 is in a direction perpendicular to the ground.

The stand receptacle assembly 204 may include the stand receptacle 106 within the stand mounting wall 104 and the receptacle covering 114 movably disposed within the stand receptacle 106. As previously described, the stand receptacle 106 may include the receptacle walls 108 having first ends along the outer surface 304 of the stand mounting wall 104, thereby, forming the first opening 302 of the stand receptacle 106. The receptacle walls 108 further include the second ends 110 forming the second opening 112 of the stand receptacle 106. In one example, the receptacle walls 108 may partially protrude from an inner surface 402 of the stand mounting wall 104. In another example, the receptacle walls 108 may partially protrude from the outer surface 304 of the stand mounting wall 104.

The stand receptacle assembly 204 may further include the receptacle covering 114 movably disposed within the stand receptacle 106 to conceal the stand receptacle 106. In one example, the receptacle covering 114 may move inside the stand receptacle 106 to the second position, in the vicinity of the second opening 112 formed by the second ends 110 of the receptacle walls 108, in response to attachment of the detachable stand 202 to the display device 100.

Further, the receptacle covering 114 may move inside the stand receptacle 106 to the first position at the first opening 302 in response to detachment of the detachable stand from the display device to conceal the stand receptacle. In one example, the first opening 302 may be formed by first ends, such as first ends 508-1 and 508-2 of the receptacle walls 108. The first ends 508-1 and 508-2 are hereinafter collectively referred to as first ends 508 and individually referred to as first end 508. Further, although the Figures illustrate the first ends 508-1 and 508-2 corresponding to the receptacle walls 108-1 and 108-2, respectively, the receptacle walls 108-3 and 108-4 may also include similar first ends.

The mounting bracket 506 may be attached to the inner surface 402 of the stand mounting wall 104 such that the mounting bracket 506 may extend over the second ends 110 of the receptacle walls 108 to at least partially cover the second opening 112 of the stand receptacle 106. In one example, the mounting bracket 506 may be coupled to the first attachment assembly to hold the first attachment assembly disposed in the stand receptacle 106. In one example, the first attachment assembly may be coupled to the mounting bracket 506 to detachably attach to the detachable stand 202 in response to the detachable stand 202 being mounted inside the stand receptacle 106. The first attachment assembly may further be coupled to the receptacle covering 114 to dispose the receptacle covering 114 within the stand receptacle 106. The first attachment assembly may further guide the movement of the receptacle covering 114 within the stand receptacle 106 in response to the detachable stand 202 being detached and attached to the display device 100.

In one example implementation of the present subject matter, the first attachment assembly may include receptacle magnets 404-1 and 404-2 attached to the mounting bracket 506 to attach to corresponding magnets in the detachable stand 202 to attach the display device 100 to the detachable stand 202. The receptacle magnets 404-1 and 404-2 are hereinafter collectively referred to as receptacle magnets 404 and individually referred to as receptacle magnet 404.

The first attachment assembly may further include multiple screws 406-1, 406-2, and 406-3, hereinafter collectively referred to as screws 406 and individually referred to as screw 406, attached to the stand receptacle 106. The screws 406 may be movably located inside corresponding openings 510 in the mounting bracket 506. Although the Figures illustrate one opening 510, the mounting bracket 506 may include multiple openings 510, with one opening corresponding to each screw 406. In one example, the screw 406 includes a first end 512 and a second end 514. The first end 512 maybe attached to the receptacle covering 114 to dispose the receptacle covering 114 within the stand receptacle 106. The second end 514 is located outside the corresponding opening 510, on a top surface 516 of the mounting bracket 506, to stop the screw 406 from entering the stand receptacle 106.

The first attachment assembly may further include multiple springs 408-1, 408-2, and 408-3, hereinafter collectively referred to as springs 408 and individually referred to as spring 408. The springs 408 are disposed on the corresponding screws 406 such that each spring 408 winds on the corresponding screw 406. In one example, the springs 408 may be in a compressed state when the receptacle covering 114 is at the second ends 110 of the receptacle walls 108. Further, the springs 408 may be in a de-compressed state when the receptacle covering 114 is at the first ends 508 of the receptacle walls 108, as illustrated in cross sectional view 502. The springs 408 and the screws 406 may thus facilitate in guiding the vertical movement of the receptacle covering 114 between the first opening 302 and the second opening 112, in response to the detachable stand 202 being detached and attached to the display device 100. For instance, the springs 408 may apply a force as they decompress from the compressed state to move the receptacle covering 114 to the first opening 302 of the stand receptacle 106 to conceal the stand receptacle 106 in response to the detachment of the detachable stand 202 from the display device 100. Further, the springs 408 may compress on application of an external force to pull the receptacle covering 114 to the second opening 112 upon the mounting of the detachable stand 202 in the stand receptacle 106.

In another example implementation of the present subject matter, the first attachment assembly may include alternate fixtures, such as snap fit fixtures, in place of the receptacle magnets 404, to attach the detachable stand 202 to the display device 100.

Further, in another example implementation of the present subject matter, the receptacle covering 114 may be hinged to a receptacle wall, say, the receptacle wall 108 such that the receptacle covering 114 may flip, pivoting on the hinges, to move from the first position to the second position in response to the attachment of the detachable stand 202 in the stand receptacle 106. In said example, the second position may be in a direction parallel to the receptacle wall 108 and in a direction perpendicular to the first position.

Figure 6:
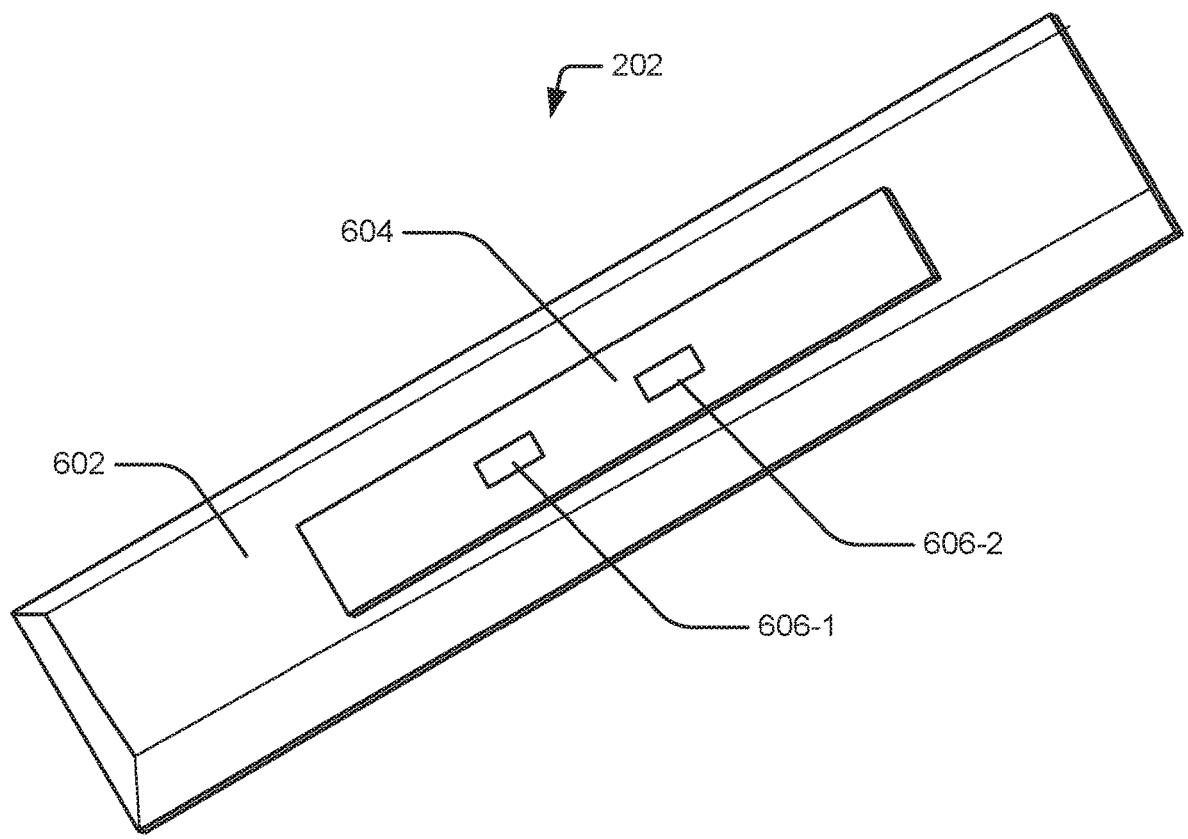
FIG. 6 illustrates a detachable stand, according to an example of the present subject matter.

FIG. 6 illustrates the detachable stand 202, according to an example of the present subject matter. As previously described, the detachable stand 202 may be mounted in the stand receptacle 106 to attach to the display device 100. In one example, the detachable stand 202 may include a base 602 to rest against the wall or the ground and a second attachment assembly to detachably attach the detachable stand 202 to the display device 100. In one example implementation, the second attachment assembly may include a mounting platform 604 and stand magnets 606-1 and 606-2, to attach to the first attachment assembly having receptacle magnets 404. In another example implementation, the second attachment assembly may include alternate fixtures, such as snap fit fixtures to attach to the corresponding fixtures of the first attachment assembly.

In one example, the mounting platform 604 may be protruding from the base 602 such that the mounting platform 604 may enter the stand receptacle 106 to mount the detachable stand 202 in the stand receptacle 106. The mounting platform 604 may thus have dimensions equal to or slightly less than the dimensions of the stand receptacle 106. The stand magnets 606-1 and 606-2, hereinafter collectively referred to as stand magnets 606 and individually as stand magnet 606, may attach to the corresponding receptacle magnets 404 of the display device 100. In one example, the stand magnets 606-1 and 606-2 may be aligned on the mounting platform 604 such that the stand magnets 606 are exactly opposite to the receptacle magnets 404 across the receptacle covering 114 when the detachable stand 202 is mounted in the stand receptacle 106.

Figure 7:
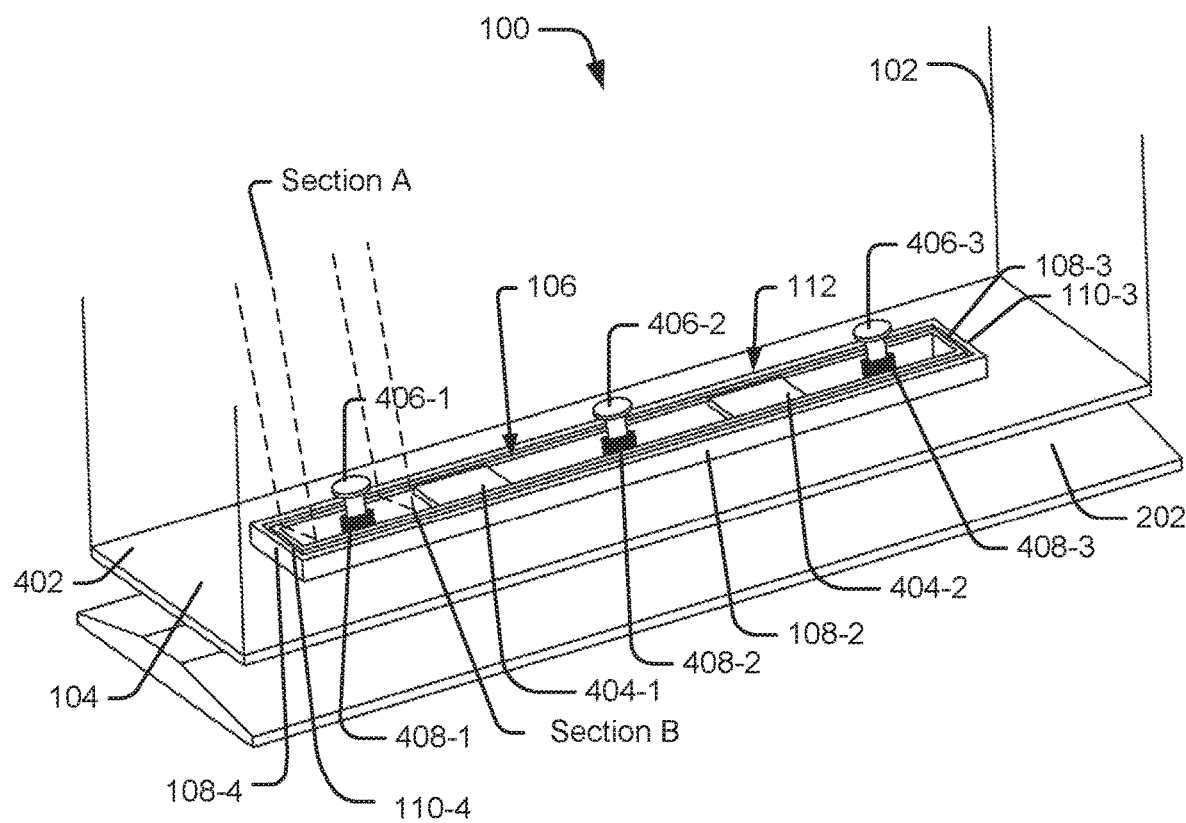
FIG. 7 illustrates the display device assembly with the display device and the detachable stand in an attached state, according to an example of the present subject matter.
Figure 8:
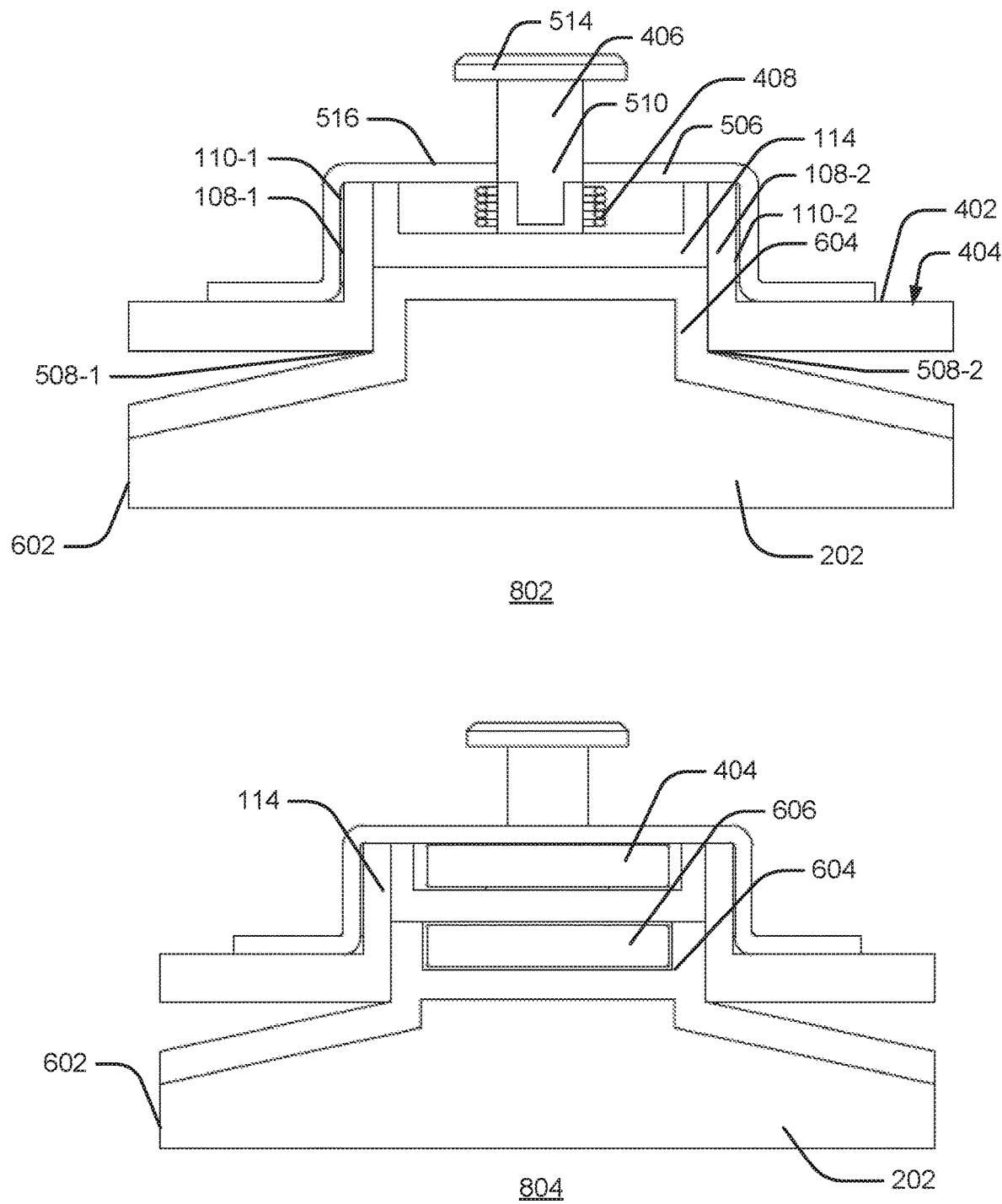
FIG. 8 illustrates sectional views of the display device assembly with the display device and the detachable stand in an attached state, according to an example of the present subject matter.

FIG. 7 illustrates the display device assembly 200 with the display device 100 and the detachable stand 202 in an attached state, according to an example of the present subject matter. FIG. 7 is further explained in conjunction with FIG. 8 for better clarity. FIG. 8 illustrates sectional views of the display device assembly 200 with the display device 100 and the detachable stand 202 in an attached state, according to an example of the present subject matter. 802 illustrates a cross sectional view of the display device assembly 200 along the section A as indicated in FIG. 7. 804 illustrates a cross sectional view of the display device assembly 200 along the section B as indicated in FIG. 7.

As previously described, to attach the detachable stand 202 to the display device 100, the detachable stand 202 may be mounted inside the stand receptacle 106 as illustrated in cross sections 802 and 804. In the detached state, the mounting platform 604 may be disposed in the stand receptacle 106 to align parallel to the receptacle covering 114, pushing the receptacle covering 114 to the second opening 112, as illustrated in cross sections 802 and 804. Further, the springs 408 may be in a compressed state in the attached state of the display device assembly 200, as illustrated in cross section 802. Further, as illustrated in FIG. 7 and cross sections 802 and 804, the screws 406 may move vertically upwards inside the corresponding openings 510 in the mounting bracket 506, thereby compressing the springs 408 and allowing the receptacle covering 114 to move to the second opening 112.

In operation, to attach the detachable stand 202 to the display device 100, a user may initially align the detachable stand 202 along the stand mounting wall 104 of the outer covering 102 such that the mounting platform 604 is aligned along the stand receptacle 106. In the detached state, the receptacle covering 114 may be at the first opening 302, thereby, concealing the stand receptacle 106. The user may thus place the detachable stand 202 along the stand mounting wall 104 such that the mounting platform 604 is in contact with the stand receptacle 106. In one example, the mounting platform 604 may be aligned along the stand receptacle 106 such that the stand magnets 606 are exactly opposite to the receptacle magnets 404 across the receptacle covering 114.

To mount the detachable stand 202 in the display device 100, the user may apply a slight force against the base 602 of the detachable stand 202, thereby pushing the mounting platform 604 against the receptacle covering 114. Due to the push, the receptacle covering 114 may move slightly inside the stand receptacle 106, thereby bringing the stand magnets 606 closer the receptacle magnets 404. The receptacle magnets 404 may thus exert a magnetic force on the stand magnets 606 to pull the stand magnets 606. As the stand magnets 606 get pulled towards the receptacle magnets 404, the stand receptacle 106 and the detachable stand 202 move further inside the stand receptacle 106, thereby compressing the springs 408. As the stand receptacle 106 moves further up, towards the second opening 112, the screws 406 may move vertically upwards inside the corresponding openings 510 in the mounting bracket 506. The receptacle covering 114 may thus move inside the stand receptacle 106 to the second ends 110 of the receptacle walls 108 in response to attachment of the detachable stand 202.

To detach the detachable stand 202, the user may hold the base 602 of the detachable stand 202 and apply a sight force to pull the detachable stand 202 out of the stand receptacle 106. As the detachable stand 202 gets slightly pulled, the springs 408 may start to decompress and exert a force on the receptacle covering 114 to move the receptacle covering 114 towards the first opening 302. The receptacle covering 114 may thus move inside the stand receptacle 106 to the first ends 508 of the receptacle walls 108 in response to detachment of the detachable stand 202 to conceal the stand receptacle 106.

Although examples for the present subject matter have been described in language specific to structural features and/or methods, it should be understood that the appended claims are not limited to the specific features or methods described. Rather, the specific features and methods are disclosed and explained as examples of the present subject matter

What is claimed is:

1. A display device comprising:
   a stand mounting wall in an outer covering of the display device;
   a stand receptacle within the stand mounting wall, the stand receptacle having receptacle walls partially protruding from the stand mounting wall of the outer covering, each of the receptacle walls having:
      a first end along an outer surface of the stand mounting wall, the first ends of the receptacle walls forming a first opening of the stand receptacle; and
      a second end forming a second opening of the stand receptacle; and
   a receptacle covering movably disposed within the stand receptacle to conceal the first opening of stand receptacle, wherein the receptacle covering is to move inside the stand receptacle to the second end of the receptacle walls in response to attachment of a detachable stand to the display device.

2. The display device as claimed in claim 1, wherein the receptacle covering is to move inside the stand receptacle to the first end of the receptacle walls in response to detachment of the detachable stand from the display device to conceal the stand receptacle.

3. The display device as claimed in claim 1, further comprising a mounting bracket attached to an inner surface of the stand mounting wall of the outer covering, the mounting bracket extending over the second end of the receptacle walls, to at least partially cover the second opening of the stand receptacle.

4. The display device as claimed in claim 3, further comprising a first attachment assembly coupled to the mounting bracket to detachably attach to the detachable stand in response to the detachable stand being mounted inside the stand receptacle.

5. The display device as claimed in claim 4, wherein the first attachment assembly further comprises:
   a receptacle magnet attached to a mounting bracket of the display device;
   multiple screws movably located inside corresponding multiple openings in the mounting bracket, a screw comprising:
      a first end attached to the receptacle covering; and
      a second end located outside the corresponding opening, on a top surface of the mounting bracket, to stop the screw from entering the stand receptacle; and
   multiple springs, wherein a spring winds on the screw from the multiple screws, and wherein the spring is in a compressed state when the receptacle covering is at the second end of the receptacle walls, and wherein the spring is in a de-compressed state when the receptacle covering is at the first end of the receptacle walls, wherein the spring is to apply a force in a de-compressed state to move the receptacle covering to the first opening of the stand receptacle to conceal the stand receptacle in response to the detachment of the detachable stand from the display device.

6. A display device assembly comprising:
   a detachable stand to be attached to a display device to support to the display device; and
   the display device having an outer covering housing a stand receptacle assembly, the stand receptacle assembly comprising:
      a stand receptacle within a stand mounting wall of the outer covering to receive the detachable stand, the stand receptacle having receptacle walls on the stand mounting wall, each of the receptacle walls having:
         a first end along an outer surface of the stand mounting wall, the first ends of the receptacle walls forming a first opening of the stand receptacle; and
         a second end forming a second opening of the stand receptacle; and
      a receptacle covering movably disposed within the stand receptacle to conceal the first opening of the stand receptacle, wherein the receptacle covering is to move to the second opening in response to attachment of the detachable stand to the display device.

7. The display device assembly as claimed in claim 6, wherein the receptacle covering is to move inside the stand receptacle to the first opening of the stand receptacle to conceal the stand receptacle, in response to detachment of the detachable stand from the display device.

8. The display device assembly as claimed in claim 6, further comprising a first attachment assembly to detachably attach to the detachable stand to attach the display device to the detachable stand.

9. The display device assembly as claimed in claim 8, wherein the first attachment assembly comprises:
   a receptacle magnet attached to a mounting bracket of the display device;
   a screw movably located inside a corresponding opening in the mounting bracket, the screw comprising:
      a first end attached to the receptacle covering; and
      a second end located outside the corresponding opening, on a top surface of the mounting bracket, to stop the screw from entering the stand receptacle; and
   a spring wound on the screw, wherein the spring is in a compressed state when the receptacle covering is at the second end of the receptacle walls, and wherein the spring is in a de-compressed state when the receptacle covering is at the first end of the receptacle walls, wherein the spring is to apply a force in a de-compressed state to move the receptacle covering to the first opening of the stand receptacle to conceal the stand receptacle in response to the detachment of the detachable stand from the display device.

10. The display device assembly as claimed in claim 9, wherein the detachable stand further comprises a second attachment assembly to detachably attach the detachable stand to the display device, wherein the second attachment assembly comprises a stand magnet to detachably attach to the receptacle magnet of the first attachment assembly.

11. A display device comprising:
    an outer covering having a stand mounting wall and a stand receptacle assembly disposed within the stand mounting wall, the stand receptacle assembly comprising:
       a stand receptacle within the stand mounting wall of the outer covering to receive a detachable stand, the stand receptacle having a first opening along an outer surface of the stand mounting wall and a second opening along second ends of receptacle walls protruding from the stand mounting wall;
       a receptacle covering movably disposed within the stand receptacle, wherein the receptacle covering is to move to a first position, along the outer surface of the stand mounting wall, to conceal the stand receptacle in response to detachment of the detachable stand from the display device, and wherein the receptacle covering is to move inside the stand receptacle to a second position in response to attachment of the detachable stand to the display device; and a first attachment assembly to detachably attach to the detachable stand in response to the detachable stand being mounted inside the stand receptacle.

12. The display device as claimed in claim 11, wherein the stand receptacle comprising the receptacle walls partially protruding from an inner surface of the stand mounting wall, each of the receptacle walls comprising:

a first end along the outer surface of the stand mounting wall, the first ends of the receptacle walls forming the first opening of the stand receptacle, wherein the first position is at the first opening of the stand receptacle; and a second end forming the second opening of the stand receptacle.

13. The display device as claimed in claim 11, wherein the stand receptacle assembly further comprises a mounting bracket attached to an inner surface of the stand mounting wall and extending over the stand receptacle, to at least partially cover the second opening of the stand receptacle.

14. The display device as claimed in claim 11, wherein the first attachment assembly further comprising:

a receptacle magnet attached to a mounting bracket of the display device;

a screw movably located inside a corresponding opening in the mounting bracket, the screw comprising:

a first end attached to the receptacle covering; and a second end located outside the corresponding opening, on a top surface of the mounting bracket, to stop the screw from entering the stand receptacle; and a spring winding on the screw, wherein the spring is in a compressed state when the receptacle covering is at the second position, and wherein the spring is in a de-compressed state when the receptacle covering is at the first position, wherein the spring is to apply a force in a de-compressed state to move the receptacle covering to the first position of the stand receptacle to conceal the stand receptacle in response to the detachment of the detachable stand from the display device.

* * * * *